United States Patent
Niklas

3,724,262
Apr. 3, 1973

[54] METHOD FOR ADJUSTING SWEPT GAIN ON ULTRASONIC PULSE-ECHO INSTRUMENTS FOR UNIFORM SENSITIVITY, IRRESPECTIVE OF FLAW DEPTH

[76] Inventor: Ludwig Niklas, 5023 Lovenich at Koln, Dachsweg 13, Germany

[22] Filed: Dec. 1, 1970

[21] Appl. No.: 94,005

[30] Foreign Application Priority Data

Dec. 2, 1969  Germany.....................P 19 60 458.1

[52] U.S. Cl...................................................73/67.8
[51] Int. Cl.............................................G01n 29/04
[58] Field of Search..............73/67.7, 67.8, 67.9, 1 R

[56] References Cited

UNITED STATES PATENTS

| 3,427,867 | 2/1969 | Nute et al.............................73/67.9 |
| 3,033,029 | 5/1962 | Weighart..............................73/67.8 |

*Primary Examiner*—James J. Gill
*Attorney*—Mattern, Ware and Davis

[57] ABSTRACT

An overlay is provided for the cathode ray tube screen of an ultrasonic pulse echo flaw detector having a swept gain control. The swept gain control, sometimes called a time-corrected gain control or a distance amplitude-correction gain control, provides for increasing the gain of the receiver system the later flaw echoes are received. By adjusting this gain properly, echoes from flaws of the same size will produce spikes of identical amplitude on the cathode ray tube screen irrespective of flaw depth. The overlay of the invention bears a plot of amplitude versus distance of echoes received from a known echo-producing interface common to a plurality of parts to be tested when the swept gain control is properly adjusted. The common echo-producing interfaces disclosed and preferably used are an interface perpendicular to the path of the ultrasonic waves in the part having a cross sectional area much greater than the cross sectional area of the ultrasonic beam in the part, a large right angle corner, and a cylindrical test hole of known diameter.

One method of the invention comprises placing the overlay of the invention on the face of the cathode ray tube display, placing the transducer of the system such that multiple echoes are reflected back and forth between opposing parallel faces of the work piece and adjusting the swept gain until the peaks of the displayed multiple echoes correspond to a plot of the peaks of such echoes on the overlay when the swept gain is properly adjusted. When the plates are to be inspected by an angle beam technique, a Y cut crystal is substituted for the normal X cut crystal to provide the ultrasonic beam perpendicular to the opposed surfaces of the plate. In a second technique disclosed, the angle beam transducer is placed at integral multiples of the half skip distance from the edge of a rectangular work piece whereby the ultrasonic echoes are reflected from the right angle corners thereof and the swept gain is adjusted until the peaks of the spikes of these echoes coincide with a plot on the overlay of the peaks of such echoes at multiples of the half skip distance when the swept gain is properly adjusted. A third method according to the invention comprises placing the angle beam transducer at integral multiples of the half skip distance from a cylindrical hole in the work piece of known diameter and again the swept gain is adjusted until the peaks of the echo pulses received at these half skip intervals correspond to a predetermined curve on the overlay, which indicates the height of the echo spikes as seen on the cathode ray tube when the swept gain is properly adjusted.

13 Claims, 6 Drawing Figures

METHOD FOR ADJUSTING SWEPT GAIN ON ULTRASONIC PULSE-ECHO INSTRUMENTS FOR UNIFORM SENSITIVITY, IRRESPECTIVE OF FLAW DEPTH

SUMMARY OF THE INVENTION

This invention relates to the art of ultrasonic testing of materials by the pulse echo technique. More particularly, it relates to a method for adjusting swept gain on ultrasonic pulse-echo instruments for uniform sensitivity, irrespective of flaw depth. The DGS (distance-gain-size) graph is known in the art of material testing with ultrasound, for the assessment of flaw size, as disclosed in U.S. patent application Ser. No. 766,796, filed Oct. 11, 1968 titled "Ultrasonic Pulse Echo Flaw Detector Employing a Spatial Scale Arrangement on the Screen of an Oscilloscope," now U.S. Pat. No. 3,608,361 which application is incorporated herein by reference. Curves on this graph plot the echo amplitudes for specific flaw sizes versus transit time in the specimen. If the peak echo amplitudes for a given size of reflector, at various distances from the probe, are connected by a line, as the transit time in the specimen increases because of divergence of the sound beam and acoustic attenuation, the amplitude of the received echoes decreases. Thus, in automatic testing, the detection of all defects of a given size at different distances from the probe by employing gating means, will present difficulties. As known per se, the automatic detection of flaws of a given size employs a threshold-value amplifier that can be pre-set to echoes of a given amplitude. If in practice the gain of this amplifier is set low to detect flaws in the vicinity of the probe, flaws of the same size at a greater distance will not be detected. Conversely, if the gain is set high to detect flaws a long distance from the probe, smaller defects close to the probe will also be detected.

A known means of remedying this is by automatic control of gain in relation to acoustic transit time. This method is referred to as "swept gain," "time-corrected gain," or "distance amplitude-correction." (See "Ultrasonic Testing of Materials", by J. and H. Krautkramer, published by Springer Verlag). However, this swept gain must be re-calibrated for each type of probe, in relation to the diameter and frequency of the probe and for each material to be tested. For this purpose test blocks with reflectors at various distances from the probe are required. Such test blocks, provided with suitable reflectors of known size, must be available in every material to be examined. The costs thereof are very considerable and the calibration is time-consuming.

The method taught by this invention obviates this disadvantage by using a train of back-wall echoes, which can be produced, for example, by directing a sound beam vertically into a plane-parallel portion of the specimen. The resulting train of back echoes falls away with distance according to a law differing from that for small reflectors. The mathematically or empirically plotted back echo curve is inscribed on the calibrated scale of the display screen of the ultrasonic test device as an adjusting aid. The invention also provides a three-dimensional scale arrangement.

OBJECTS OF THE INVENTION

It is therefore among the objects of the present invention to improve the art of ultrasonic pulse echo testing, to increase the use of the swept gain technique, to reduce the amount of time and effort required in order to adjust the swept gain prior to testing a work piece, and to facilitate automatic testing.

Other objects of the invention will in part be obvious and will in part appear hereinafter.

An embodiment of the method taught by the invention is illustrated in the drawings and is hereinafter described in detail.

The invention accordingly comprises the several steps and the relation of one or more of such steps with respect to each of the others thereof, which will be exemplified in the method hereinafter disclosed; the features of construction, combination of elements, and arrangement of parts which will exemplified in the construction hereinafter set forth; and an article of manufacture possessing the features, properties, and the relation of elements which will be exemplified in the article hereinafter described. The scope of the invention will be indicated in the claims.

THE DRAWINGS

For a fuller understanding of the nature and objects of the invention, reference should be had to the following detailed description taken in connection with the accompanying drawings, in which.

The same reference numbers refer to the same elements throughout the several views of the drawings.

SPECIFIC DESCRIPTION

Figure 6:
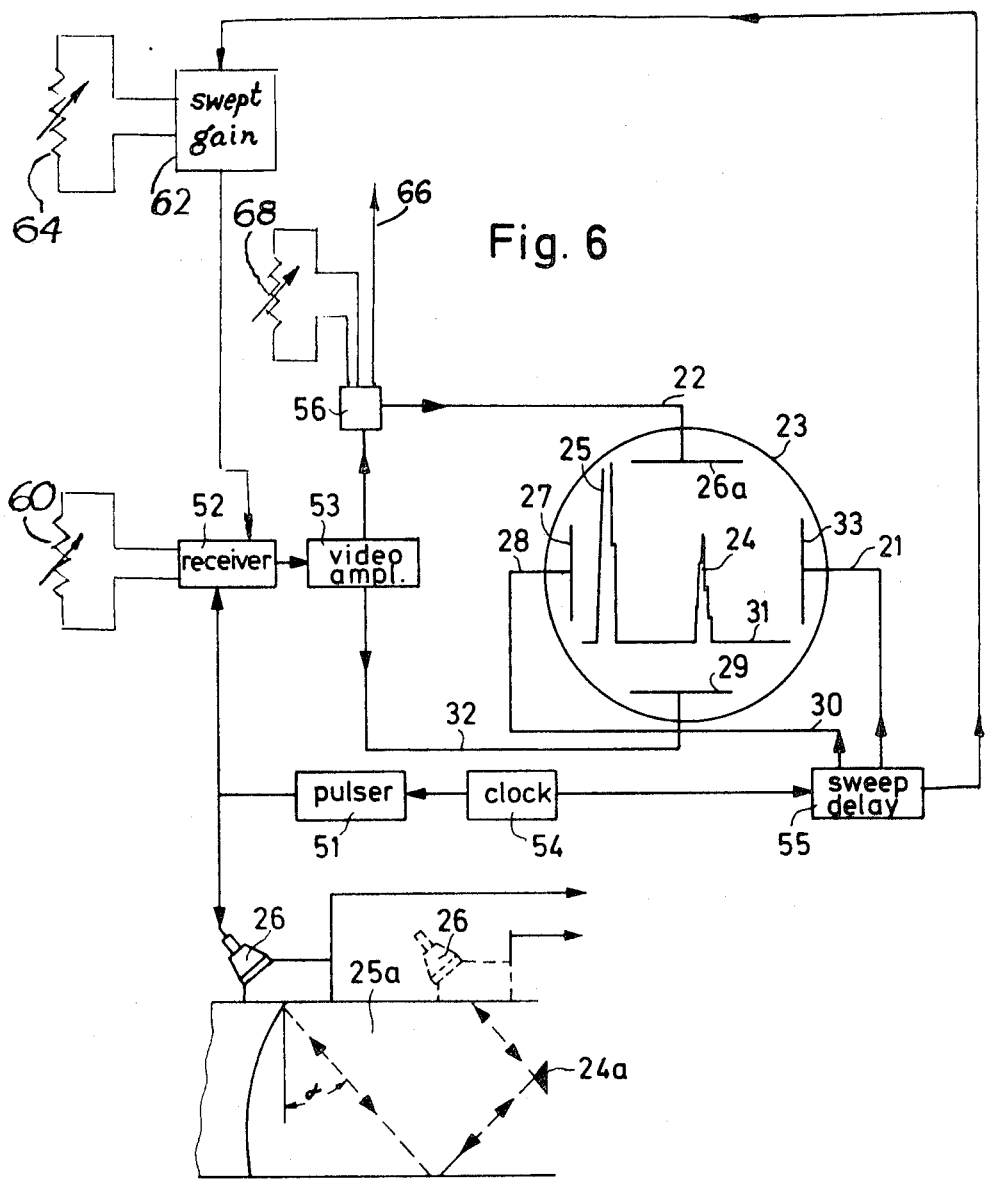
FIG. 6 is a diagram of an apparatus partially in schematic form, for carrying out the process according to the invention.

Ultrasonic pulse echo inspection apparatus for use in the invention is shown schematically in FIG. 6. A pulser 51 supplies probe 26 with a high voltage pulse, which is converted into an ultrasonic pulse in the probe 26. The ultrasonic pulse returned by a reflector (a flaw 24a in work piece 25a) to the probe 26 is converted into an electrical pulse. The pulse is amplified in a receiver 52 and further amplified in a video amplifier 53 and a monitor 56. Thence, the amplified pulse is fed via leads 22 and 32 to the deflection plates 29 and 26a, of a cathode ray tube 23 to vertically deflect the electron beam of the CRT 23. A clock or trigger 54 triggers the pulser 51 for generating the high voltage pulses at preselected time intervals, and synchronously starts a sweep delay 55, which is connected to horizontal deflection plates 27 and 33 through cables 21 and 28. The sweep delay 55 generates a saw tooth voltage for deflecting the electron beam horizontally. The deflection delay corresponds to the transit time of the sound beam in the specimen 25a. The CRT screen presents the demonstrated display. The initial pulse, which arrives at the receiver on a direct path from pulser 51, appears at the left as spike 25 where the zero point of the time base 31 is set by adjusting the sweep delay. A flaw echo 24 appears at a distance from spike 25 proportional to the sound path from the probe to the flaw 24a and back via a reflection at the rear side of the piece 25a, provided the time base calibration is accurate.

The ultrasonic inspection apparatus used in the invention may, for example, be a Krautkramer Ultrasonic Flaw Detector, Model USIP 10 W, available from Krautkramer Ultrasonics, Inc., in Stratford, Connecticut. As is known in the art, this apparatus provides an amplifier gain control 60 and swept gain circuitry 62 responsive to a signal from the sweep delay 55 to increase the gain at the right hand side of the cathode ray screen 23 for greater depths and to reduce the gain at the left hand side of the screen for smaller depths, the relative degree of swept gain correction being controlled by a swept gain control 64. The apparatus further provides an alarm output on line 66 from the monitor or threshold amplifier 56. The threshold or "gate" of monitor 56 is controlled by a threshold control 68 for automatic detection of flaws of a given size after the swept gain has been properly adjusted.

Figure 1:
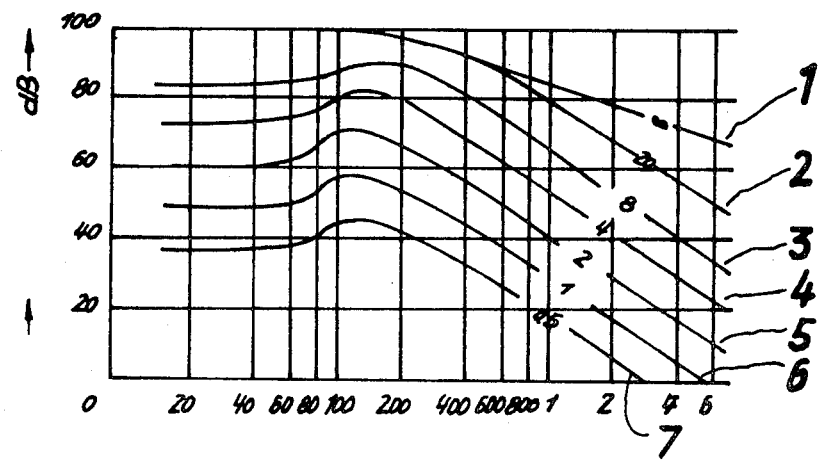
FIG. 1 is a graph on a calibrated scale, of echo heights plotted against distance from the probe forming a family of curves, each of said curves relating to a reflector of a different size.

An example of the relation of the heights of echoes in dB of different size reflectors to distance on a logarithmic scale starting in millimeters with no swept gain correction is illustrated in FIG. 1. Curve 1 relates to reflectors of infinite size or larger than the cross-sectional area of the sound beam. In practice, such reflectors are constituted by the back wall of a flat specimen. Curves 2 through 7 plot the height of echoes received from cylindrical test holes of different sizes, in this example of relative diameters from 0.5 mm. to 20 mm. It will be clearly seen that the loss of height with distance is much greater for echoes reflected from cylindrical test holes than, for example, from a flat, level back wall, as depicted in curve 1.

Figure 2:
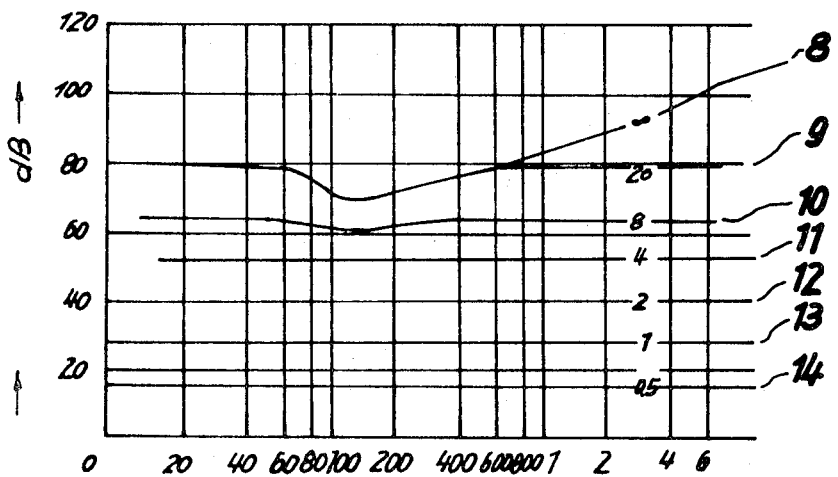
FIG. 2 is a graph on a calibrated scale of the same family of curves plotted subsequent to application of swept gain.

FIG. 2 shows the height of echoes obtained in the same conditions, from the same small cylindrical test holes, which after correct adjustment of the swept gain are no longer related to distance. Curves 10 through 14 corresponding to curves 3 through 7 plot the height of echoes from the small test holes. Curve 9, which corresponds to curve 2 in FIG. 1, shows the relationship of a cylindrical test hole of the same diameter (e.g. 20 mm.) as the probe. Note that curve 8, corresponding to curve 1 in FIG. 1, for reflectors of infinite size or larger than the cross-sectional area of the sound beam, rises steeply with distance when the swept gain is adjusted correctly.

Figure 3:
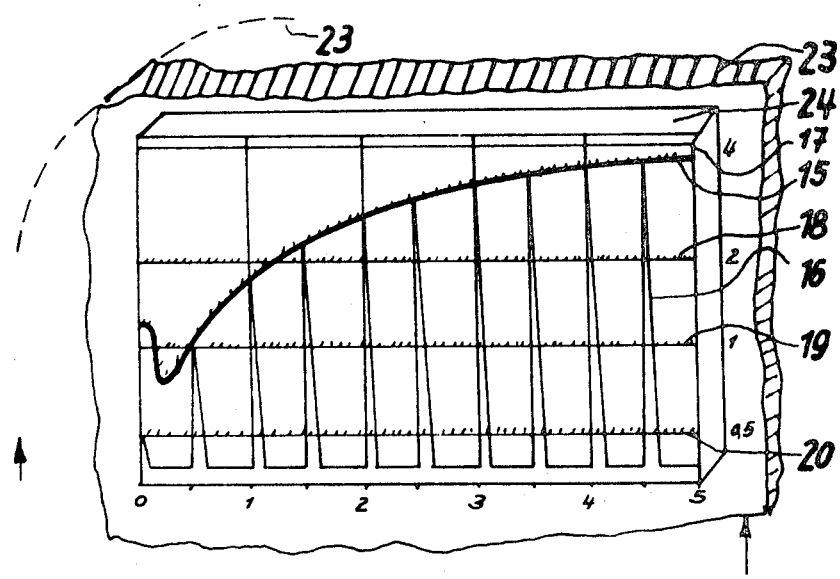
FIG. 3 is a front view of a calibrated scale arrangement, overlayed on a test instrument display screen, with the trace of a train of back-wall multiple echoes seen as series of peaks, and the back echo curve printed on the overlayed scale.

If the probe employed is next placed on the specimen at a point plane-parallel to the back wall, the trace displayed will take the form of a series of peaks, as shown at 16 in FIG. 3, because the back echo is reflected back and forth several times. (Multiple-echo train). If by means of the gain 60 and swept gain 64 controls of the ultrasonic flaw detector (FIG. 6) the peaks of the successive bottom echoes are rendered coincidental with curve 15, corresponding to curve 8 in FIG. 2, it will be automatically ensured that the flaw detector is correctly adjusted for small reflectors, that is to say, the echo traces displayed will not be related to distance. Note that the horizontal scale of FIG. 3 is linear rather than logarithmic and that the vertical scale is expanded, changing the shape of curve 8 of FIG. 2 into curve 15 of FIG. 3.

Should it be desired to detect very small defects in a workpiece, difficulties will be experienced with a calibrated scale, as shown in FIG. 2, because the peaks of the echoes displayed will extend only slightly above the lower edge of the screen.

This drawback can be overcome with the aid of the calibrated scale depicted in FIG. 3. This scale distinguishes from the scale shown in FIG. 2 in that the back echo curve is lowered, by 20 dB (decibels), for example, in the case of curve 8 in FIG. 2. To calibrate the flaw detector the peaks of the successive back wall echoes are first brought into line with the back echo curve 15. However, before the testing can proceed, the overall gain of the flaw detector must then be increased by 20 dB.

If angle probes are to be employed, as is usual for weld examination, for example, the specimen 25 will generally have no suitable back wall at right-angles to the beam axis. In this case a transducer with a Y-cut crystal, having the same frequency as the angle probe, is placed on the specimen to set the swept gain. Like the angle probe, said transducer transmits transverse waves, but in the vertical direction. For the correct calibration of the swept gain, the peaks of the resulting sequence of back echoes displayed on the ultrasonic flaw detector's screen are brought into line with the back echo curve, bearing reference numeral 15 in FIG. 3. Generally, it cannot be assured that with the same pulse voltage the Y-probe will produce the same acoustic pressure as the angle probe, as a result of which this method may entail a loss in the relationship of the back echo curve 15 in FIG. 3 and the flaw echo curves 18, 19 and 20. Therefore, prior to the examination procedure, the overall gain of the flaw detector must be re-calibrated with the aid of the angle probe. Several methods for doing this are known in the art and are widely used, their choice depending on the application. For example, calibration can be to the echo received from a half-moon-shaped workpiece or from a hole in a test block conforming to German test Standard DIN 54120 of July 1963.

Figure 4:
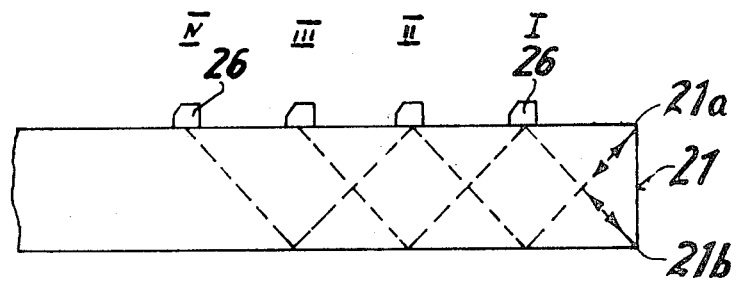
FIGS. 4 and 5 are diagrams of the path of sound in a specimen with angle probes placed at integral multiples of the half skip distance.

If the afore-described method for calibrating the swept gain with the aid of a special Y-probe is too expensive, an alternative procedure can be employed if the specimen has a straight smooth edge forming a right angle corner or a machined hole. To use the echoes reflected by an edge for setting the swept gain, the angle probe, as shown in FIG. 4, should be placed at intervals of a half, once, once and a half, and twice the skip distance from edge 21, corresponding to alternate reflections from right angle corners 21a and 21b. (See U.S. application Ser. No. 766,796). This corresponds to positions I, II, III and IV of the probe 26 in FIG. 4. The gain and swept gain of the flaw detector should then be re-adjusted so that the peaks of the echoes displayed coincide with curve 15 in FIG. 3.

Figure 5:
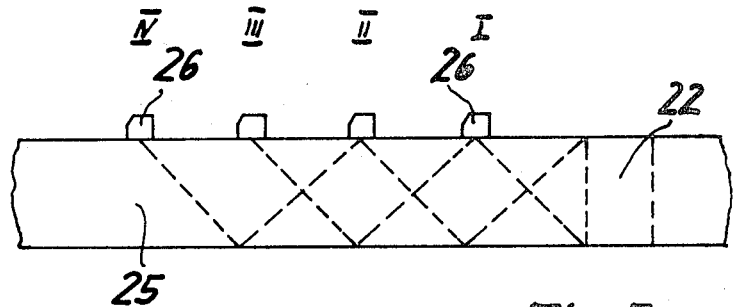

Similarly, calibration can be effected with the echo from a test hole 22, as shown in FIG. 5. But another curve corresponding to curve 15 in FIG. 3 would have to be re-plotted, either mathematically or empirically, for the respective probe and the particular test hole.

All of the afore-described embodiments of the invention have an advantage in common; calibration of swept gain takes account not only of loss of echo height with distance as a result of sound beam divergence, as is usual, but also the effect of ultrasonic attenuation in the workpiece. The method can also be employed for longitudinal waves.

A feature of the invention is the three-dimensional calibrated scale arrangement on the screen of a cathode-ray oscilloscope for performing one of the afore-stated procedures. Thus, a calibrated scale 24 is attached or pressed on to a backing member or a flat mount 23, FIG. 3. The aforesaid new method calls for the use of scale marks of special arrangement, not disclosed by U.S. application Ser. No. 766,796, for example. The calibrated scale or overlay 24, which is likewise flat or can be slightly arcuate, is preferably of a transparent material and is provided with horizontal lines in the form of elevations or depressions 17, 18, 19, 20. The lines can be applied by pressure forming, printing or spraying, and may be black or of some other color and represent the levels of the peaks of echoes from reflectors of a given size, that is to say, from cylindrical test holes of known diameter. For example, line 20 is for an 0.5 mm. dia. hole, line 19 refers to a 1 mm. dia. hole, and lines 18 and 17 to cylindrical test holes 2 mm. and 4 mm. in diameter, respectively. In addition to curve 15 of back wall echoes, above lines 18, 19 and 20, there is preferably another line, in the form of an elevation or depression, constituting a curve substantially of the same shape as curve 15, which for the sake of clarity has been omitted. Said curve plots the envelope of predetermined, theoretical peak amplitudes of the echoes reflected by the right angle corners of edge 21 or of the surface hole interface of hole 22 in the specimen 25a, when the probe 26 is placed in the half skip positions I, II, III and IV, shown in FIGS. 4 and 5. The backing member or positioning mount 23 can be of contoured shape, as indicated in broken outline. In most practical applications, the lower section of curve 15 intersects horizontal lines 18 to 20.

It will thus be seen that the objects set forth above, among those made apparent from the preceding description, are efficiently attained and, since certain changes may be made in carrying out the above method or in the above construction or article without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described may invention, what I claim as new and desire to secure by Letters Patent is:

1. A method of adjusting the swept gain of an ultrasonic pulse echo flaw detector instrument to uniform sensitivity comprising the steps of:
   A. charting the envelope of the variation of peak amplitude of echoes which are detected when the swept gain of the instrument is correctly adjusted in a test piece having at least one predetermined multiple echo producing interface; and
   B. later adjusting the swept gain of the instrument to produce a display of echoes having the same variation of peak amplitude produced in a work piece having another predetermined multiple echo producing interface producing echoes having the same variation of peak amplitude.

2. The method defined in claim 1 wherein the multiple echo producing interface in said test piece is a reflecting wall at right angles to the path of propagation of the ultrasonic pulses produced by the instrument.

3. The method defined in claim 2 wherein the predetermined multiple echo producing interface in the work piece is also a wall at right angles to the path of propagation of the ultrasonic pulses produced by the instrument.

4. The method defined in claim 2 wherein said work piece comprises parallel faces and the predetermined multiple echo producing interface in said work piece is an end wall at right angles to said parallel faces in the work piece and said adjusting step is performed by placing an angle beam transducer connected to said instrument at multiples of the half skip distance between the transducer and the right angle end wall.

5. The method defined in claim 1 wherein said predetermined multiple echo producing interface in the test piece is a hole of predetermined diameter and said echoes are produced therefrom by an angle beam technique with the angle beam transducer positioned at multiples of the half skip distance from said hole and the predetermined multiple echo producing interface in the work piece is a hole of the same diameter as the hole in the test piece.

6. The method defined in claim 1 and the additional step of:
   C. thereafter adjusting the overall gain of the instrument to produce a known amplitude echo from a predetermined known echo producing test piece.

7. The method defined in claim 6 wherein said swept gain adjusting step is performed using a Y cut crystal transducer, and said overall gain adjusting step is performed using an X cut crystal transducer.

8. The method defined in claim 1 wherein said flaw detector instrument provides an A-scan display and said charting and adjusting steps are accomplished by overlaying the chart produced by said charting step on the display produced by the instrument during said adjusting step.

9. The method defined in claim 8 and the further steps of:
   C. charting lines corresponding to the amplitude of echoes produced from flaws of known size on said chart when the overall gain of the instrument is correctly adjusted; and
   D. thereafter, when said chart is overlayed on the display produced by the pulse echo instrument and after said first adjusting step, adjusting the overall gain of the instrument to produce a known amplitude echo from a predetermined known echo producing test piece by adjusting the peak amplitude of the echo produced thereby to coincide with one of the lines on said chart.

10. An overlay for use in adjusting the swept gain of an ultrasonic pulse echo flaw detector to uniform sensitivity, said detector having a pulse echo display comprising:
   A. a transparent support adapted to be overlaid on said pulse echo display; and B. indicia on said support indicating the variation in amplitude of echoes produced on the display when the swept gain is correctly adjusted by pulse echoes received from any piece having at least one multiple echo producing interface of a predetermined geometry.

11. The overlay defined in claim 10 wherein the pulse echo display is of the deflection type and said indicia takes the form of a plot of echo amplitude.

12. The overlay defined in claim 10, and

C. at least one additional indicia on said display indicating at least one constant amplitude produced by a known discontinuity irrespective of distance when the swept gain and the overall gain of said detector is properly adjusted.

13. The overlay defined in claim 12 wherein said first indicia is a continuous curve of increasing amplitude at large distances and said second indicia are one or more straight lines.

* * * * *